(12) United States Patent
Jonsson

(10) Patent No.: US 6,764,117 B2
(45) Date of Patent: Jul. 20, 2004

(54) BUMPER FOR A VEHICLE

(75) Inventor: Martin Jonsson, Lulea (SE)

(73) Assignee: SSAB Hardtech AB, Lulea (SE)

(*) Notice: Subject to any disclaimer, the term of this patent is extended or adjusted under 35 U.S.C. 154(b) by 0 days.

(21) Appl. No.: 10/378,756

(22) Filed: Mar. 4, 2003

(65) Prior Publication Data

US 2003/0141727 A1 Jul. 31, 2003

Related U.S. Application Data

(63) Continuation-in-part of application No. PCT/SE01/02003, filed on Sep. 19, 2001.

(30) Foreign Application Priority Data

Sep. 19, 2000 (SE) .............................................. 0003418

(51) Int. Cl.[7] .............................................. B60R 19/22
(52) U.S. Cl. ........................ 293/109; 293/121; 293/132; 296/187.03; 296/187.04
(58) Field of Search ................................. 293/102, 109, 293/120, 121, 132, 135, 136; 296/187.03, 187.04, 187.09

(56) References Cited

U.S. PATENT DOCUMENTS

| 4,018,466 A | | 4/1977 | Norlin | |
| 4,826,226 A | * | 5/1989 | Klie et al. | 293/120 |
| 5,803,514 A | * | 9/1998 | Shibuya et al. | 293/133 |
| 6,474,708 B1 | * | 11/2002 | Gehringhoff et al. | 293/120 |

FOREIGN PATENT DOCUMENTS

| DE | 4341884 | 6/1994 |
| GB | 2081653 | 2/1982 |
| GB | 2374575 | 10/2002 |
| WO | 9520506 | 8/1995 |
| WO | 9920490 | 4/1999 |

\* cited by examiner

*Primary Examiner*—D. Glenn Dayoan
*Assistant Examiner*—H. Gutman
(74) *Attorney, Agent, or Firm*—Mark P. Stone

(57) ABSTRACT

A bumper comprises a hat beam (11) adapted to have its crown directed towards the vehicle body, a cover (20) attached to the side flanges (17, 18) of the hat beam and having a longitudinal recess (21) that extends into the hat beam, and an energy absorbing foamed body (22) that fills out the recess and extends with its major part out of the recess. If the foamed body widens out over the side flanges (17, 18) of the hat beam, these widened parts (25) should have recesses (31) that prevent these parts from being fully compacted before the part therebetween is compacted if the bumper hits a pedestrian's leg. A closed cross-section beam having a longitudinal recess can also be employed in the present invention.

12 Claims, 5 Drawing Sheets

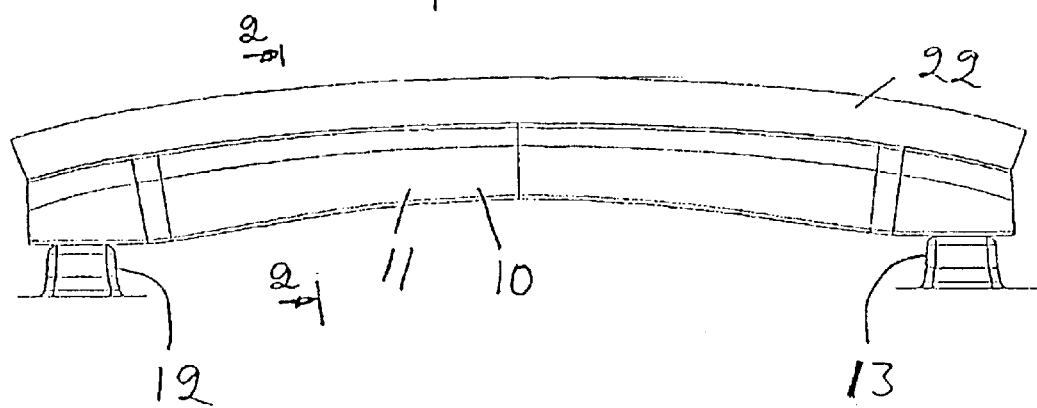
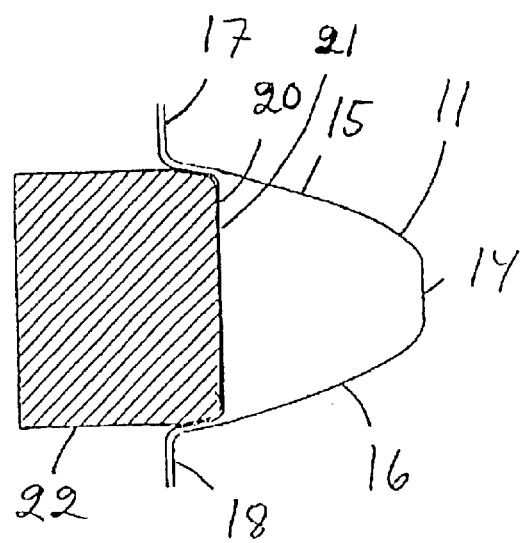

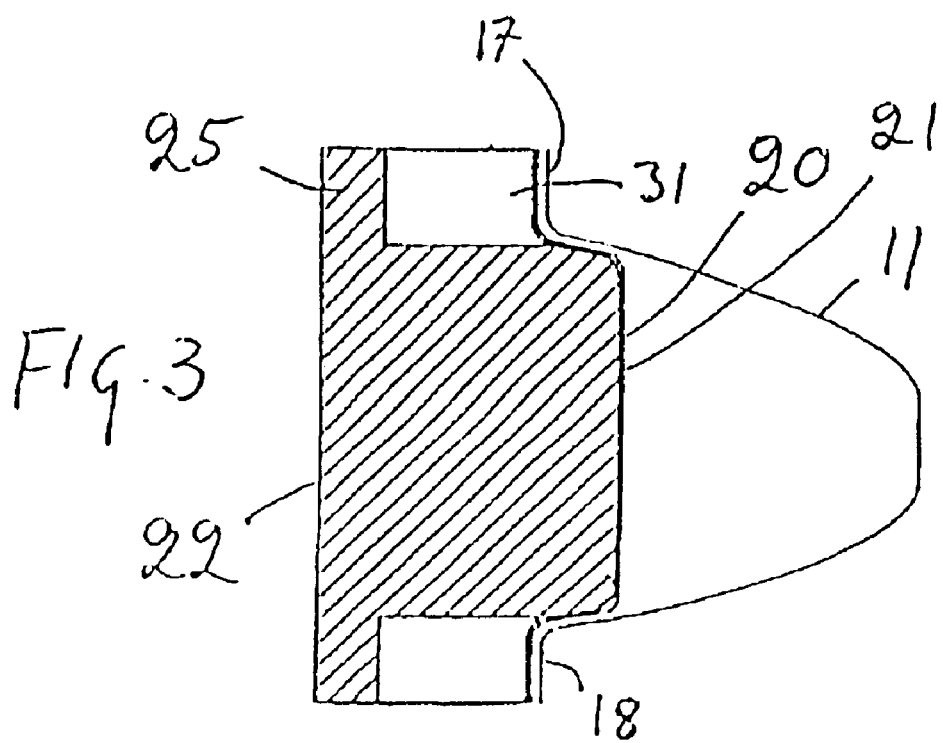

BUMPER FOR A VEHICLE

This application is a continuation-in-part of International Application PCT/SE01/02003, having an international filing date of Sep. 19, 2001, published in English under PCT Article 21(2).

TECHNICAL FIELD

This invention relates to a bumper for a vehicle, comprising a hat beam adapted to have its crown directed towards the vehicle body, a cover attached to the side flanges of the hat beam and having a longitudinal recess that extends into the hat beam to a depth of between 1/10 and 1/3 of the profile height of the hat beam, and an energy absorbing foamed body that fills out the recess and extends out of the recess so that 65–85% of the depth of the foamed body is outside the hat beam. A closed cross-section beam having a longitudinal recess may be employed instead of a hat beam.

BRIEF DESCRIPTION OF PRIOR ART

A bumper of this kind is known from WO 9920490. The foamed body is used to absorb energy by being compressed before the hat beam will be deformed to take up energy. The foamed body extends over the side flanges of the hat beam and the front surface of the foamed body is almost flat so that, if the bumper hits a barrier, the foam will be compressed to compactness on the side flanges and will become totally stiff while the foam therebetween will still be resilient. The foam in the middle cannot be compacted to stiffness until the beam itself has been deformed. In the above mentioned publication, a modified bumper is also shown which has a flat cover and the foam will therefore give a more uniform resistance force when compressed.

OBJECT OF INVENTION AND BRIEF DESCIPTION OF THE INVENTION

It is an object of the invention to provide a bumper beam with a foamed body that gives a more uniform load vertically on an object that is hit, for example the legs of a pedestrian, combined with a reduced horizontal extension of the entire bumper for a given strength. To this end, the part of the foamed body that extends out of the beam, which can be a hat beam or a closed cross-section beam, has either at most the same area as in the recess or alternatively it widens out over the side flanges and has recesses that reduce the difference in compactness to be less than 15% when the bumper hits a vertical pillar and any part of the foamed body is compresses to total compactness.

BRIEF DESCRIPTION OF THE DRAWINGS

FIG. 1 illustrates a top view of an example of a bumper beam in accordance with the present invention;

FIG. 2 is a transverse section taken along line 2—2 in FIG. 1;

FIG. 3 generally corresponds to FIG. 2 but illustrates a modified embodiment of the bumper beam in accordance with the present invention;

DESCRIPTION OF PREFERRED EMBODIMENTS OF THE INVENTION

Figure 4:
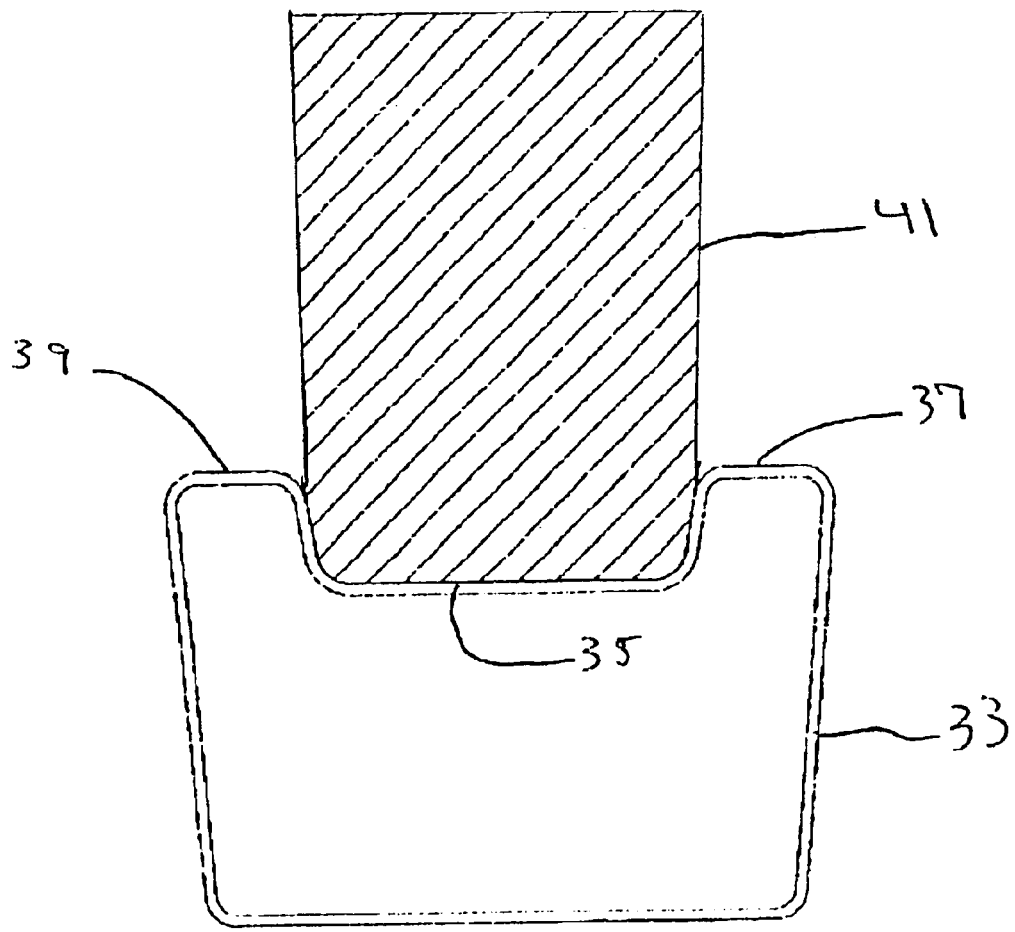
FIG. 4 illustrates a further modified embodiment of a bumper beam in accordance with the present invention.

FIG. 1 shows a bumper beam 10 which is fastened to two crash boxes 12, 13 and the crash boxes are fastened to the vehicle body, for example to the front ends of the side rails (side beams). The bumper beam 10 is formed from a sheet steel and it comprises a so-called hat beam 11 and a cover 20 as can be seen in FIG. 2. The hat beam 11 has a crown that comprises a top 14 (top flange) and two flanks 15, 16. The flanks end in side flanges 17, 18. The bumper beam is fastened in the two crash boxes 12, 13 with its crown directed towards the vehicle body, for example the body of a passenger car.

The cover 20 is fastened, for example spot-welded, to the side flanges 17, 18. It has a longitudinal recess 21 into the beam 11 and the recess fills the entire profile width of the beam. The recess 21 has a flat bottom. A comparatively stiff foamed body 22 of an elastomeric material (a foam beam) fills the entire width of the recess and it is fastened to the bottom of the recess 21. The recess 21 extends into the hat beam 11 to a depth of between 1/10 and 1/3 of the depth (the profile height) of the hat beam and such a recess has only a minor influence on the strength of the closed beam 11, 20. The energy absorbing foamed body 22 fills out the recess 21 and extends out of the recess so that 65–85% of the depth of the foamed body is outside the hat beam. The foamed body must reach full compactness before its front end reaches the level of the side flanges 17, 18 when it is compressed. Otherwise the area of the two side flanges would be the only force-taking surface when the foamed body has been compressed to the level of the side flanges. When a pedestrian has been hit, this sudden reduction of the energy aborbing surface would increase the injuries.

The recess 21 in the cover 20 will have only a minor influence on the strength of the beam 11, 20 but it will make it possible to reduce the horizontal width of the entire bumper since the major part of the foamed body will be inside the beam 11, 20. If the horizontal length available for the bumper is limited, which is usually the case, this reduction in the length of the foamed body outside the beam can be used to make the beam 11, 20 bigger and thus increase the strength of the bumper without increasing the injuries of a pedestrian hit by the car.

FIG. 3 shows a foamed body 22 having one recess 31. The recess 31 is provided in the portion of the foamed body which extends over the side flanges 17, 18, thereby providing a space between the extended portion 25 of the foamed body 22 and the side flanges 17, 18 of the cover 20. This embodiment of the invention is advantageous since it increases the vertical extension of the foamed body, which reduces the load on the legs of a pedestrian hit by the car. The recess 31 in the extended portion 25 of the foamed body assures that the portion of the foamed body directly over the longitudinal recess 21 in the cover 20 will be compressed to full compactness before the portion 25 of the foamed body extending over the flanges 17, 18 is compressed to full compactness when the bumper strikes, for example, a vertical pillar, or a flat barrier, or a pedestrian's legs. The compressible foamed body illustrated by FIG. 3 has a T-formed transverse section with a comparatively thick and strong flange portion 25.

Figure 5:
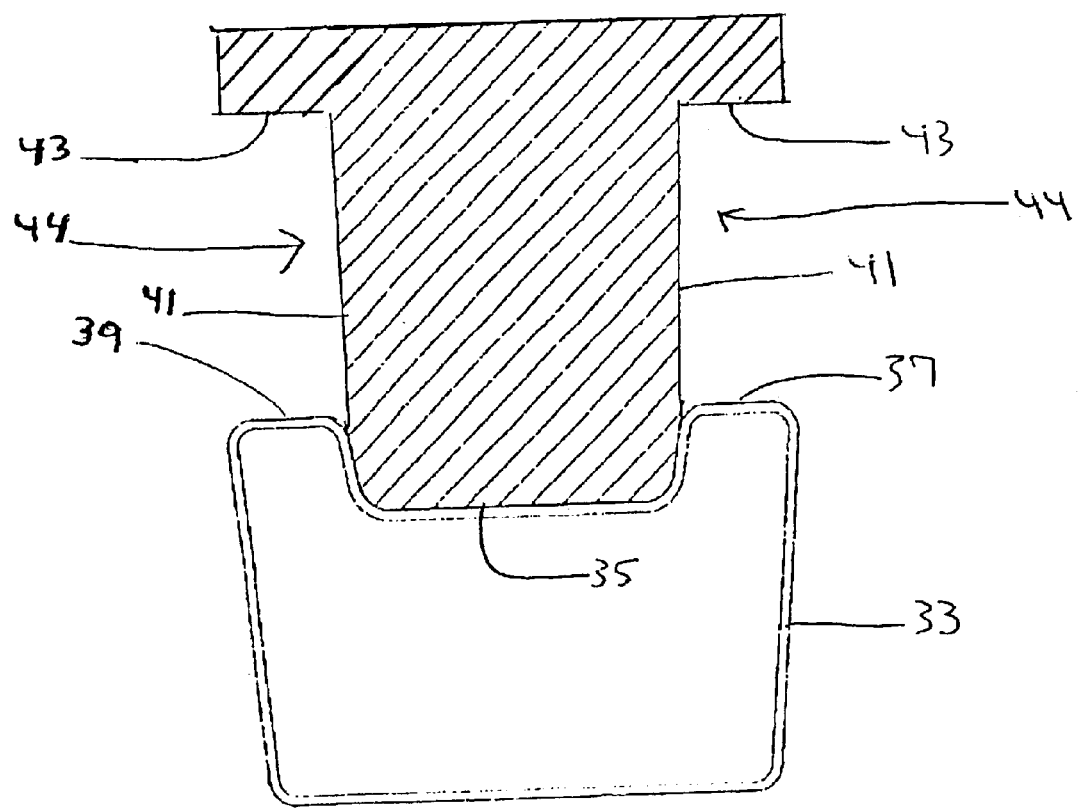
FIG. 5 illustrates another modified embodiment of a bumper beam in accordance with the present invention.
Figure 6:
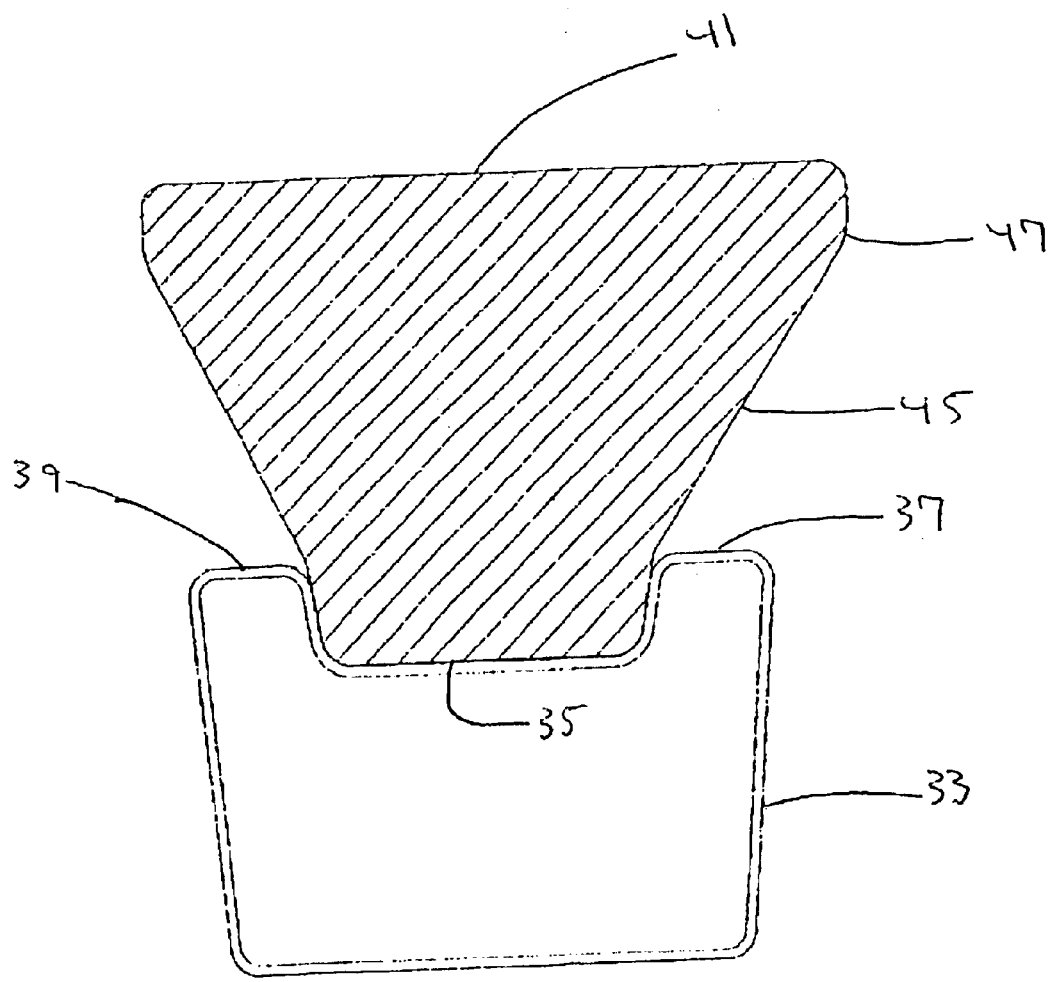
FIG. 6 illustrates yet another modified embodiment of a bumper beam in accordance with the present invention.

FIGS. 4–6 illustrate further embodiments of bumper beams in accordance with the present invention. FIG. 4 generally corresponds to the embodiment illustrated by FIG. 2, except that the bumper beam illustrated by this embodiment and designated by reference numeral 33, has a closed cross-section, and is not formed from a hat beam and a cover as discussed with respect to the embodiments of the invention illustrated by FIGS. 2 and 3. The closed cross-section beam is an integral structure which can be formed, for example, as a section of extruded aluminum, or as a closed roll formed section of steel. The integral, closed cross-section beam 33 defines a longitudinal recess designated by reference numeral 35. The beam 33 also includes opposed sides 37 and 39 disposed on opposite sides of the longitudinal recess 35. A compressible foamed body 41 is received, at least in part, in the longitudinal recess 35.

The operation of the embodiment of the bumper beam illustrated by FIG. 4 is the same as that discussed previously herein with respect to FIG. 2. The basic difference between the embodiment illustrated by FIG. 4 is that beam 33 is formed integrally in closed cross section, while the beam of the embodiment illustrated by FIG. 2 is formed from a hat profile beam and a cover mounted to the beam.

FIG. 5 illustrates an embodiment of the present invention which generally corresponds to the embodiment illustrated by FIG. 3 of the drawing, except that the bumper beam 33 of the FIG. 5 embodiment is formed as a closed cross-section structure, as discussed with respect to FIG. 4. The integral, closed cross-section beam 33 can be formed, for example, as an extruded aluminum section, or as a closed roll formed section of steel. As discussed with respect to FIG. 4, the beam 33 defines a longitudinal recess 35, and opposed sides 37 and 39 disposed on opposed sides of the longitudinal recess 35. The compressible foamed body 41 illustrated by FIG. 5 is of a T-shaped sectional configuration having portions 43 extending over the opposed sides 37 and 39 of the beam 33. One recess, designated by reference numeral 41, is defined between the extended portions 43 of the foam body 41 and the opposed sides 37 and 39 of the beam 33.

The foamed body 41 illustrated by FIG. 5 corresponds to the foamed body of the bumper beam illustrated by FIG. 3, previously discussed herein. The operation of the FIG. 5 embodiment is the same as that previously discussed with respect to the FIG. 3 embodiment. The basic difference between the bumper beam illustrated by FIG. 5 and that illustrated by FIG. 3 is that the FIG. 5 embodiment employs an integral, closed section bumper while the FIG. 3 embodiment employs a hat profile beam with a cover mounted to it.

FIG. 6 of the drawing illustrates an embodiment of the invention also employing a bumper beam 33 integrally formed as a closed cross-section beam as discussed with respect to FIGS. 4 and 5 of the drawing. The bumper beam 33 illustrated by FIG. 6 is an integral structure which can be formed, for example, as a section of extruded aluminum, or as a closed roll formed section of steel. As also discussed with respect to FIGS. 4 and 5, the integral beam 33 illustrated by FIG. 6 has a longitudinal recess 35, and opposed sides 37 and 39 disposed on opposite sides of the longitudinal recess.

The compressible foamed body 41 of the bumper beam illustrated by FIG. 6 includes a rear portion received within the recess 35 of the beam 33, and an extended portion generally designated by reference numeral 45. The extended portion 45 of the foamed body 41 tapers outwardly over the opposed sections 37 and 39 of the beam 33 at a generally continuous predetermined angle of inclination. However, as the extended portion 45 approaches the outer ends of the beam 33, the forward part of the foamed body 41 is inclined substantially perpendicularly to the front end of the beam 33. This perpendicular orientation of the foamed body 41 is generally illustrated by reference numeral 47 in FIG. 6.

The operation of the bumper beam illustrated by FIG. 6 of the drawing corresponds to that previously discussed herein with respect to the bumper beam illustrated by FIG. 3 of the drawing. The basic differences between the bumper beam illustrated by FIG. 6 and that illustrated by FIG. 3 are the differences in the configuration of the extended portion of the respective foamed bodies, and that the beam illustrated by FIG. 6, is an integral, closed cross-section structure, while the beam illustrated by FIG. 3 is formed from a hat beam with a cover mounted to it.

Although the configuration of the foamed body 41 in FIG. 6 is illustrated with respect to the integral, closed cross-section beam 33, the same configuration of the foamed body 41 can also be used together with the beams illustrated by FIGS. 2 and 3 of the drawing which are formed from hat beams with covers mounted thereto and not as integral closed cross-section beams.

A foam suitable for use in all the embodiments may have about 30% of its original volume when compressed to full compactness and the dimensions in the designs of FIGS. 3, 5 and 6 should be such that the difference in compactness vertically should be less than 15% in the foamed body when any part of the foam reaches full compactness when the bumper hits a pedestrian's leg which can be considered as a vertical pillar. Preferably, the main part of the foam body, that is, the part adjacent to the recess 21 in the cover 20 (FIG. 3) or adjacent to the recess 35 of the closed cross-section beam (FIGS. 5 and 6), should be fully compacted before or simultaneously with the parts adjacent the side flanges 17, 18 (FIG. 3) or the parts adjacent the opposed sides 37, 39 of the closed cross-section beam (FIGS. 5 and 6). In the design of FIGS. 2 and 4, it is important that the foam reaches full compactness while it extends out of the beam; otherwise the load-taking surface will be reduced to the area of the two side flanges 17, 18 (FIG. 2) or the opposed sides 37, 39 (FIG. 4) when the front surface of the foamed body reaches the level of the flanges or opposed sides during the compression of the foamed body.

What is claimed is:

1. A bumper for a vehicle, said bumper comprising a beam defining a longitudinal recess and having opposed sides extending respectively from opposed sides of said longitudinal recess, said bumper being oriented relative to said vehicle so that said longitudinal recess faces outwardly of said vehicle; a compressible energy absorbing material received, at least in part, in said longitudinal recess and oriented such that a part of said energy absorbing material extends beyond said beam in a direction outwardly from said vehicle, a portion of said extending part of said energy absorbing material also extending over said opposed sides of said beam; said portion of said energy absorbing material extending over said opposed sides of said beam defining at least one recess therein for reducing the difference in compactness of said energy absorbing material disposed over said longitudinal recess in said beam and said energy absorbing material extending over said opposed sides of said beam to less than 15% when either said energy absorbing material disposed over said longitudinal recess or said energy absorbing material extending over said opposed sides of said beam is fully compressed.

2. The bumper as claimed in claim 1, wherein said at least one recess in said energy absorbing material is dimensioned so that said energy absorbing material disposed over said longitudinal recess in said beam is fully compressed before said energy absorbing material extending over said opposed sides of said beam is fully compressed.

3. The bumper as claimed in claim 1, wherein said portion of said energy absorbing material extending over said opposed sides of said beam defines a plurality of said recesses.

4. The bumper as claimed in claim 1, wherein said energy absorbing material comprises a foamed body.

5. The bumper as claimed in claim 1, wherein said beam is formed in a closed cross-section.

6. The bumper as claimed in claim 1, wherein said beam is formed as a hat beam.

7. The bumper beam as claimed in claim 6, further including a cover mounted to said hat beam, said cover defining said longitudinal recess, said opposed sides of said beam being formed by flanges on said hat beam and said cover, said flanges on said hat beam and said cover provided for mounting said cover to said hat beam.

8. The bumper as claimed in claim 1, wherein said longitudinal recess extends into said beam a distance of between one third and one tenth of the depth of said beam.

9. The bumper as claimed in claim 1, wherein said energy absorbing material and said longitudinal recess are arranged so that between 65–85% of said energy absorbing material extends beyond said beam.

10. The bumper as claimed in claim 1, wherein said energy absorbing material completely fills said longitudinal recess.

11. The bumper as claimed in claim 1, wherein the bottom of said longitudinal recess is defined by a flat portion of said beam.

12. The bumper as claimed in claim 1, wherein the energy absorbing material and said longitudinal recess are arranged so that at least part of said energy absorbing material extends beyond said beam when said energy absorbing material is fully compressed.

* * * * *

UNITED STATES PATENT AND TRADEMARK OFFICE
CERTIFICATE OF CORRECTION

PATENT NO. : 6,764,117 B2  Page 1 of 1
APPLICATION NO. : 10/378756
DATED : July 20, 2004
INVENTOR(S) : Martin Jonsson It is certified that error appears in the above-identified patent and that said Letters Patent is hereby corrected as shown below:

Column 3, Line 28:

Delete "41", and substitute -- 44 --.

Signed and Sealed this

Twenty-ninth Day of May, 2007

JON W. DUDAS
*Director of the United States Patent and Trademark Office*